United States Patent
Congdon et al.

(10) Patent No.: US 10,135,673 B2
(45) Date of Patent: Nov. 20, 2018

(54) COMMUNICATING DATA ASSOCIATED WITH DIFFERENT PERSONAS OF A USER

(75) Inventors: Paul T. Congdon, Granite Bay, CA (US); Sujata Banerjee, Palo Alto, CA (US); Ran-Fun Chiu, Los Altos, CA (US); Kyu Han Kim, Palo Alto, CA (US); James S. Hiscock, Rockport, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 379 days.

(21) Appl. No.: 14/400,366

(22) PCT Filed: Jun. 15, 2012

(86) PCT No.: PCT/US2012/042628
§ 371 (c)(1),
(2), (4) Date: Nov. 11, 2014

(87) PCT Pub. No.: WO2013/187911
PCT Pub. Date: Dec. 19, 2013

(65) Prior Publication Data
US 2015/0127786 A1    May 7, 2015

(51) Int. Cl.
| | |
|---|---|
| *G06F 15/16* | (2006.01) |
| *H04L 12/24* | (2006.01) |
| *H04W 12/08* | (2009.01) |
| *H04W 80/06* | (2009.01) |
| *H04W 88/02* | (2009.01) |

(52) U.S. Cl.
CPC ......... *H04L 41/0803* (2013.01); *H04W 12/08* (2013.01); *H04W 80/06* (2013.01); *H04W 88/02* (2013.01)

(58) Field of Classification Search
CPC .................................................. H04L 67/1095
USPC ....................................................... 709/220
See application file for complete search history.

(56) References Cited

U.S. PATENT DOCUMENTS

| | | |
|---|---|---|
| 6,512,525 B1 | 1/2003 | Capps et al. |
| 6,976,054 B1 | 12/2005 | Isaac et al. |
| 7,391,748 B2 | 6/2008 | Feather |
| 7,835,743 B2 * | 11/2010 | Zhang ............... H04L 29/06027 455/436 |
| 9,532,286 B2 * | 12/2016 | Hiscock ............... H04W 36/14 |
| 2005/0117546 A1 | 6/2005 | Lioy et al. |
| 2008/0008159 A1 * | 1/2008 | Bourlas .................. H04L 69/32 370/352 |
| 2008/0081606 A1 | 4/2008 | Cole |
| 2009/0016245 A1 | 1/2009 | Karls |
| 2009/0325562 A1 | 12/2009 | Hough et al. |
| 2010/0210304 A1 | 8/2010 | Huslak et al. |
| 2010/0290398 A1 | 11/2010 | Choudhary |
| 2010/0313009 A1 | 12/2010 | Combet |

(Continued)

OTHER PUBLICATIONS

Extended European Search Report, EP Application No. 12878839.5, dated Jan. 18, 2016, pp. 1-6.

(Continued)

*Primary Examiner* — Hamza N Algibhah
(74) *Attorney, Agent, or Firm* — Trop, Pruner & Hu, P.C.

(57) ABSTRACT

An electronic device has a plurality of environments including respective communication stacks. The environments correspond to respective different user personas. Data associated with the different user personas are communicated in corresponding separate transport flows over the network.

15 Claims, 7 Drawing Sheets

(56) References Cited

U.S. PATENT DOCUMENTS

| | | | |
|---|---|---|---|
| 2011/0045798 A1 | 2/2011 | Dietz | |
| 2011/0141124 A1* | 6/2011 | Halls | G06F 21/83 |
| | | | 345/522 |
| 2011/0213688 A1 | 9/2011 | Santos | |
| 2012/0240185 A1* | 9/2012 | Kapoor | H04L 63/1425 |
| | | | 726/1 |
| 2013/0288741 A1* | 10/2013 | Sjadieh | H04W 88/06 |
| | | | 455/552.1 |
| 2013/0329639 A1* | 12/2013 | Wietfeldt | H04W 88/06 |
| | | | 370/328 |
| 2013/0336284 A1* | 12/2013 | Hiscock | H04W 36/14 |
| | | | 370/331 |

OTHER PUBLICATIONS

International Search Report and Written Opinion, International Application No. PCT/US2012/042628, dated Mar. 21, 2013, pp. 1-7.

Armbrust et al., Above the Clouds; A Berkeley View of Cloud Computing, Feb. 2009 (25 pages).

Brian Madden's ConsumerizeIT.com—Blog—BYOD Smackdown 2012: MaaS360 checks all the boxes (MDM, MIM, and MAM) from the cloud, Apr. 2012 (2 pages).

Cisco, Administration Guide far CiscoMobile 8.1 and 8.0 for iPhone, Jan. 2012 (47 pages).

Cisco, White Paper, The Future of Hotspots: Making Wi-Fi as Secure and Easy to Use as Cellular, dated earlier than May 2012 (9 pages).

Cuervo et al., MAUI: Making Smartphones Last Longer with Code Offload, Jun. 2010 (14 pages).

Hiscock et al., U.S. Appl. No. 13/524,290 entitled Controlling Communication of Data for Different User Personas filed Jun. 15, 2012 (32 pages).

Kim et al., Improving TCP Performance over Wireless Networks with Collaborative Multi-homed Mobile Hosts, 2005 (14 pages).

Kim et al., Wireless Networks 11, A Receiver-Centric Transport Protocol for Mobile Hosts with Heterogeneous Wireless Interfaces, 2005 (20 pages).

Messmer, E., "Debate rages over how to manage personal mobile devices used for work", Jul. 27, 2011.

Perkins, Network Working Group, IP Mobility Support for IPv4, Jan. 2002 (106 pages).

Ra et. al., Odessa: Enabling Interactive Perception Applications on Mobile Devices, Jul. 2011 (14 pages).

Satyanarayanan et al., The Case for VM-based Cloudlets in Mobile Computing, Oct. 2009 (10 pages).

Wolbach et al., Transient Customization of Mobile Computing Infrastructure, CMU-CS-08-117, Apr. 2008 (11 pages).

* cited by examiner

COMMUNICATING DATA ASSOCIATED WITH DIFFERENT PERSONAS OF A USER

BACKGROUND

A user can use an electronic device in various different roles. For example, the electronic device may be used by the user in both a work context (such as part of the user's employment by an enterprise) or in a personal context (for personal communications such as personal e-mails, social networking posts, and so forth).

BRIEF DESCRIPTION OF THE DRAWINGS

Some embodiments are described with respect to the foilowing figures.

DETAILED DESCRIPTION

Some enterprises (e.g. business concerns, government agencies, educational organizations, etc.) allow a user to use a common electronic device (either the user's personal electronic device or the user's work electronic device) for tasks relating to different roles of the user. The different roles of the user can correspond to different personas of the user, where the different personas can include, as examples, a work persona that relates to communications of the user associated with work for an enterprise, and a personal persona relating to personal communications (e.g. personal e-mails, social networking posts, etc.) of a user. The user can also have other personas, such as another persona relating to charity work by the user, a further persona associated with being a member of a sports league, and so forth.

Security can be a concern when a user uses the same electronic device for tasks associated with the different personas of the user. To enhance security of data associated with the work persona of the user, for example, it is desirable to maintain separation of data associated with the work persona from data associated with other persona(s) of the user.

In accordance with some implementations, techniques or mechanisms are provided to transport data for the different personas of a user in different transport flows. Maintaining separation between data of the different personas of the user allows for isolation of data associated with the different personas of the user, which improves security of data associated with a particular persona (e.g. work persona) of the user.

A "transport flow" refers to a session, stream, or connection that allows for an exchange of data between or among at least two endpoints in a network. In some examples, a transport flow can be in the form of a logical network, such as a virtual local area network (VLAN) or other type of logical network. One or multiple logical networks can be defined on a physical network that includes physical network infrastructure, which can include communication nodes such as switches or routers, and interconnection links between the communication nodes.

Figure 1:
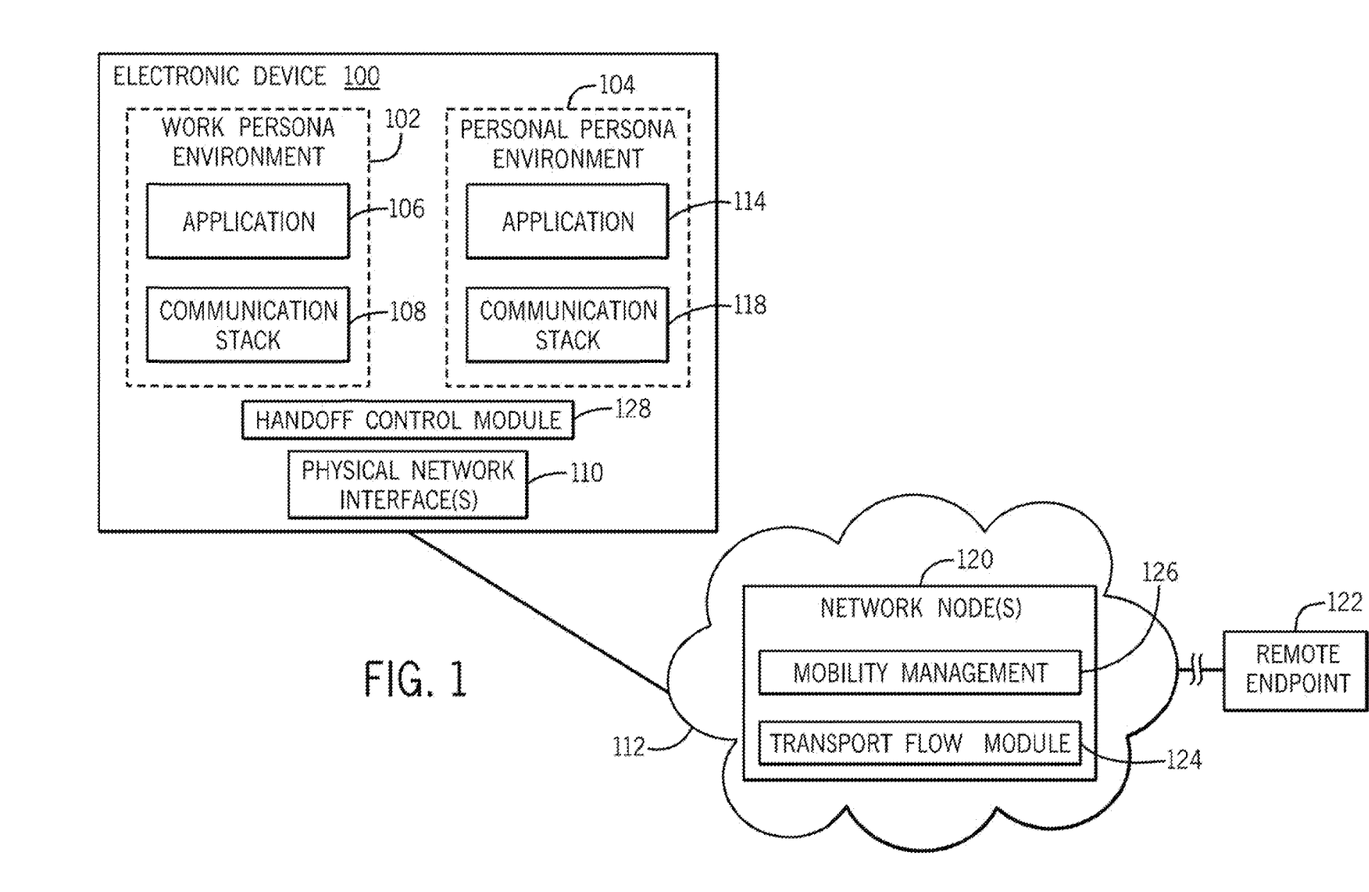
FIG. 1 is a block diagram of an example network arrangement that incorporates some implementations.

FIG. 1 is a block diagram of an example network arrangement that includes an electronic device 100 that is coupled to a network, in accordance with some implementations. In some examples, the electronic device 100 can include a mobile device, such as a smartphone, a personal digital assistant (PDA), a tablet computer, a notebook computer, and so forth. In other examples, the electronic device 100 can be a desktop computer, game console, or some other type of electronic device.

The electronic device 100 includes multiple environments for respective different personas of a user of the electronic device 100. In the example of FIG. 1, two environments 102, 104 are depicted, where the environment 102 is for a work persona of the user, and the environment 104 is for the personal persona of the user. Although just two environments 102, 104 are depicted for the work and personal personas, respectively, of a user, in the FIG. 1 example, it is noted that in other examples, additional or alternative environments can be provided for other personas of the user.

The different environments 102, 104 can be different virtual or logical environments defined in the electronic device 100. As examples, each environment 102, 104 can be a virtual machine, which can refer to a partition of segment of a physical machine (such as the electronic device 100). A virtual machine virtualizes or emulates a physical machine. From the perspective of a user or application, a virtual machine can look just like a physical machine. A virtual machine can include one or multiple applications, and other components, such as an operating system, device drivers, and so forth.

In different examples, the environments 102 and 104 can be implemented with different types of partitions in the electronic device 100.

The work persona environment 102 includes at least one application 106 (e.g. web browser, word processing application, spreadsheet application, etc.) and a communication stack 108. The application 106 is used by the user as part of the work persona of the user. The communication stack 108 is used for communicating (transmitting and/or receiving) data associated with the work persona of a user with a physical network interface 110 is used to communicate data of the electronic device 100 over a network 112.

Note that there can be one physical network interface 110, or multiple physical network interfaces, in the electronic device 100. A physical network interface 110 can be a physical wireless network interface to allow the electronic device 100 to communicate wirelessly with the network 112. Alternatively, the physical network interface 110 can be a wired physical network interface for wired connection to the network 112. In some examples, the physical network interface 110 can be implemented as a network interface card.

The personal persona environment 104 similarly includes at least an application 114 and a communication stack 118. The communication stack 118 in the environment 104 is used for communicating data associated with the personal persona of the user with the physical network interface 110. In examples where there is just one physical network interface 110, the physical network interface 110 is shared by the communication stacks 108 and 118 in the different environments 102, 104. In examples where there are multiple physical network interfaces 110, then different ones of the physical network interfaces 110 can be used for communicating data with respective different ones of the communication stacks 108 and 118 in the environments 102 and 104, respectively.

Each of the environments 102 and 104 can also include other modules, such as an operating system (not shown), and so forth.

As further shown in FIG. 1, the network 112 includes network node(s) 120 for routing data through the network 112. The network node(s) 120 can include an access point (e.g. wireless or wired access point) and other network node(s), as examples. As examples, such other network node(s) can include any one or combination of switch, router, a firewall, a load balancer, and so forth. A remote endpoint 122 (which can be another electronic device or a server, as examples) is coupled to the network 112. The network nodes 120 can communicate data between the electronic device 100 and the remote endpoint 122.

The network node(s) 120 of the network 112 can include a transport flow module 124, which is able to establish multiple transport flows for communicating respective data of the work persona environment 102 and personal persona environment 104, respectively. As discussed further below, different logical network connection points can be established in the electronic device 100, such as at the communication stacks 108 and 110, for the multiple transport flows. The transport flow module 124 in the network node(s) 120 is able to separate data from the electronic device 100 into the multiple transport flows, depending upon which logical network connection point the data is associated with.

The network node(s) 120 can also include a mobility management module 126, which can be used to manage mobility of the electronic device 100, such as when the electronic device 100 is wirelessly attached to a wireless access network. For example, the mobility management module 126 can manage handoff of the electronic device 100 from a source wireless access network to a destination wireless access network, such as when the electronic device 100 crosses a boundary between different coverage areas of the corresponding wireless access networks. The mobility management module 126 of the network node(s) 120 can interact with a handoff control module 128 in the electronic device 100 for performing the handoff operations.

Figure 2A:
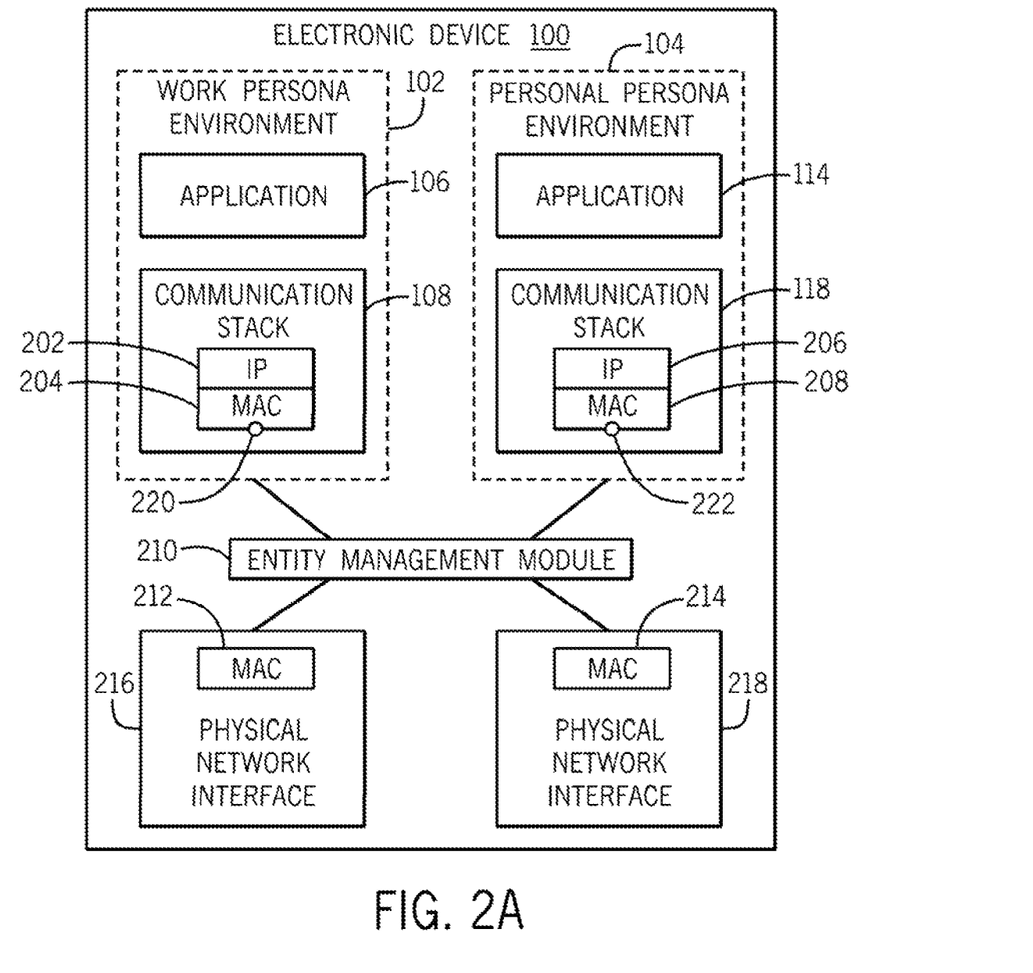
FIGS. 2A-2C are block diagrams of example electronic devices according to various implementations.
Figure 2B:
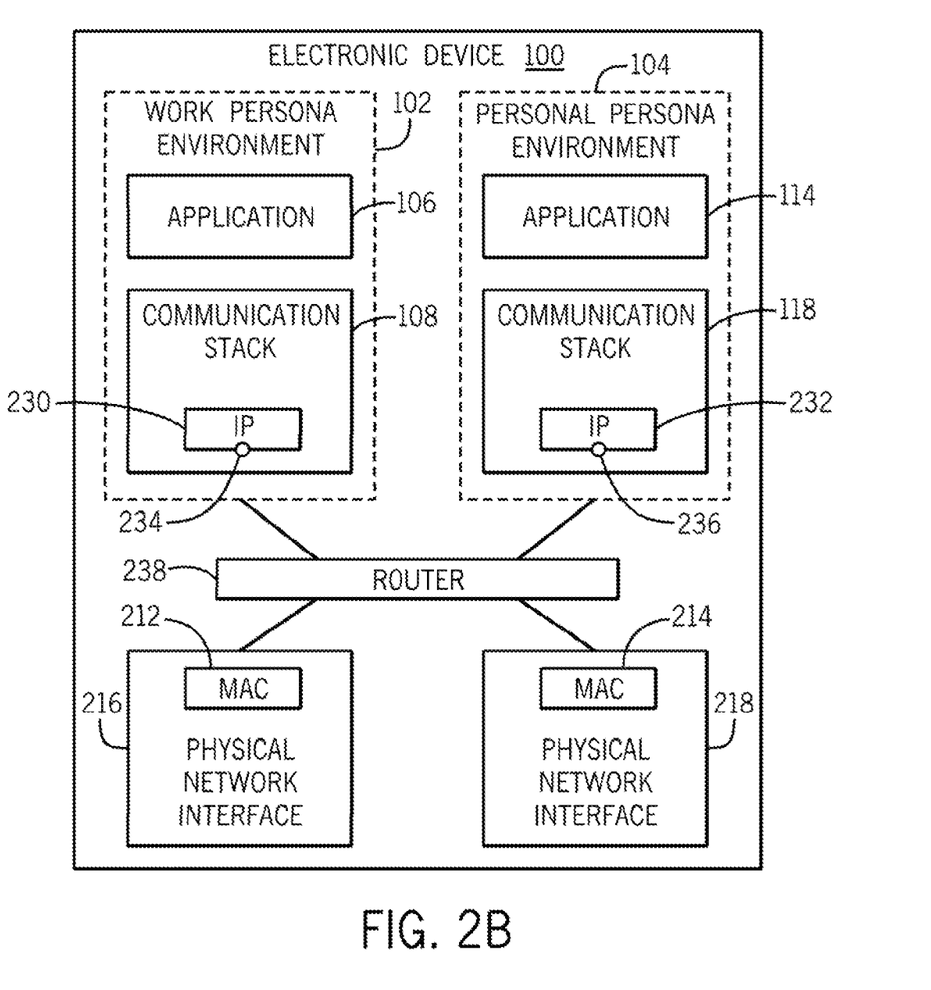
Figure 2C:
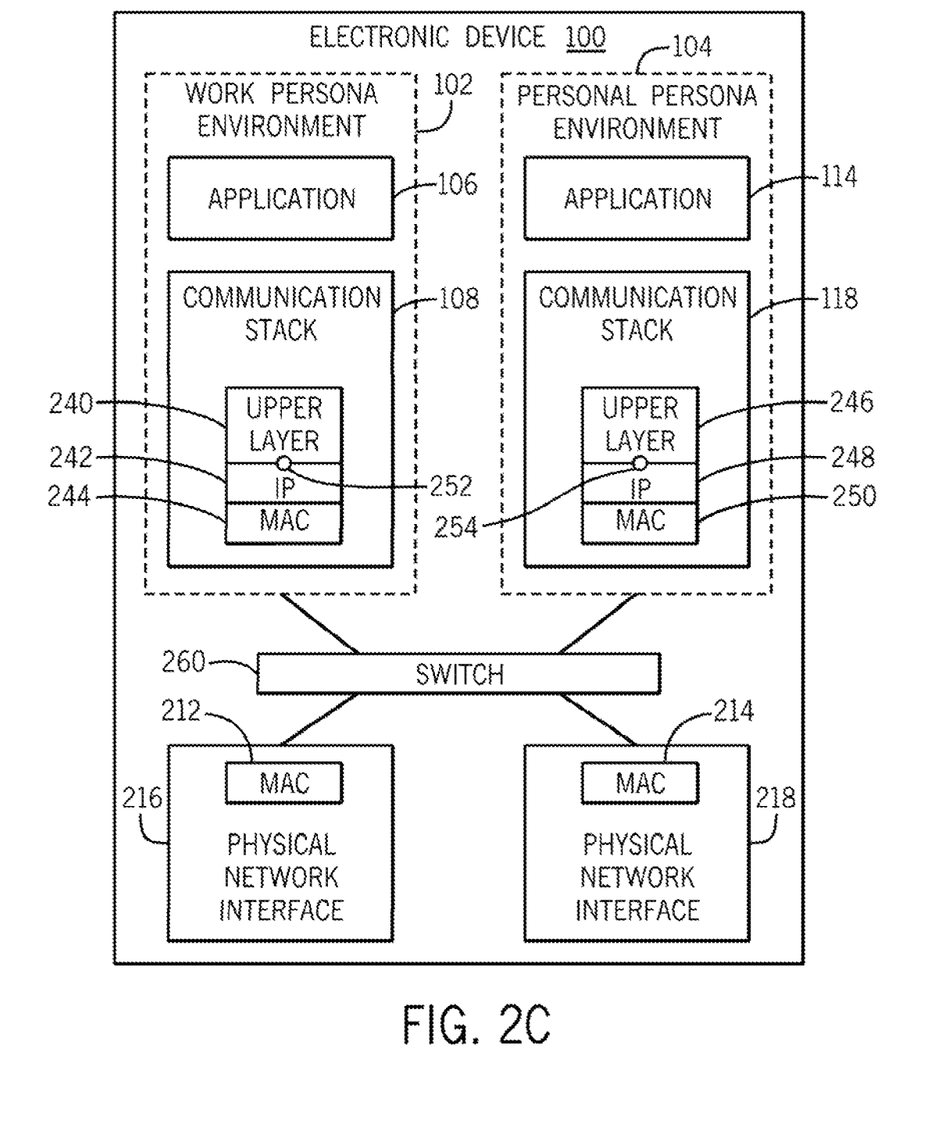

FIGS. 2A-2C illustrate three different example implementations of the environments 102 and 104 of the electronic device 100. In FIG. 2A, the communication stack 108 of the work persona environment 102 includes an Internet Protocol (IP) layer 202 and a Medium Access Control (MAC) layer 204. Similarly, the communication stack 118 of the personal persona environment 104 includes an IP layer 206 and a MAC layer 208.

The IP layer 202 or 206 performs network communications using IP packets, where each IP packet contains source and destination IP addresses to identify a source network device and a destination network device. The IP addresses are used to route the IP packets through the network 112 (FIG. 1).

The MAC layer 204 or 208 is a data link layer that provides addressing and channel access control mechanisms to allow for multiple network devices to communicate over a shared network. The MAC layer 204 or 206 can use MAC addresses for communicating data frames between a source network device and a destination network device.

It is noted that the IP layer 202 or 206 is above the respective MAC layer 204 or 208 in the corresponding communication stack 108 or 118. An IP packet generated by an IP layer is carried in the payload section of a MAC frame produced by a MAC layer.

Although not shown, the communication stack 108 or 118 of FIG. 2A can further include additional layers above the IP layer 202 or 206.

In examples according to FIG. 2A, the electronic device 100 further includes an entity management module 210 to map data between a MAC layer 204 or 208 in the environment 102 or 104 and at least one physical MAC layer associated with at least one physical network interface of the electronic device 100. In the example of FIG. 2A, two MAC layers 212 and 214 are associated with respective physical network interfaces 216 and 218.

The entity management module 210 can selectively map the MAC layer 204 in the work persona environment 102 to either the MAC layer 212 or MAC layer 214 in the physical network interface 216 or 218, respectively. Similarly, the entity management module 210 can map the MAC layer 208 in the personal persona environment 104 to either the MAC layer 212 or MAC layer 214. Mapping data between the MAC layers refers to mapping between a MAC address of a MAC layer associated with the physical network interface and a MAC address of the MAC layer associated with the environment 102 or 104. For example, if the entity management module 210 routes data of the work persona environment 102 through the physical network interface 218, then the entity management module 210 would map between the physical MAC address of the MAC layer 214 in the physical network interface 218, and an internal or logical MAC address associated with the MAC layer 204 of the communications stack 108 in the work persona environment 102.

In some examples, the MAC layers 212 and 214 associated with the physical network interfaces 216 and 218 can be referred to as "physical" MAC layers. On the other hand, the MAC layers 204 and 208 in the respective communications stacks 108 and 118 of the environments 102 and 104, respectively, can be referred to as "internal" or "logical" MAC layers.

In examples according to FIG. 2A, logical network connection points 220 and 222 are provided at the respective internal MAC layers 204 and 208 of the communication stacks 108 and 112, respectively. A logical network connection point can refer to a point in the electronic device 100 to which a transport flow is established. In FIG. 2A, the two different logical network connection points 220 and 222 are identified by respective different MAC addresses associated with the internal MAC layers 204 and 208. Thus, a transport flow for carrying data associated with the work persona environment 102 is established with the logical network connection point 220, whereas a transport flow of data for the personal persona environment 104 is established with the logical network connection point 222.

In alternative implementations, as shown in FIG. 2B, logical network connection points 234 and 236 are provided at an IP layer 230 and an IP layer 232, respectively, of the communication stacks 108 and 118. A router 238 in the electronic device 100 can be provided to route data between the IP layers 230 and 232 and MAC layers 212 and 214. The router 238 can selectively route data between the IP layer 230 and either the MAC layer 212 or 214, and similarly, the router 238 can selectively route data between the IP layer 232 and either the MAC layer 212 or 214.

Providing logical network connection points 234 and 236 at the IP layers 230 and 232, respectively, of the communication stacks 108 and 118, causes transport flows of data for the work persona environment 102 and personal persona environment 104, respectively, to be routed to IP addresses associated with the respective IP layers 230 and 232.

FIG. 2C shows yet another alternative example, where the communication stack 108 includes an upper layer 240, an IP layer 242, and a MAC layer 244, and similarly, the communication stack 118 includes an upper layer 246, an IP layer 248, and a MAC layer 250. In some examples, the upper layer 240 or 246 can be a Transmission Control Protocol (TCP) layer, which is used to establish a connection with a peer or counterpart TCP layer at a remote network device. TCP provides reliable, ordered delivery of data units between endpoints. In other examples, different types of upper layers 240 and 246 can be employed.

In examples according to FIG. 2C, logical network connection points 252 and 254 are provided at the upper layers 240 and 246. Providing a logical network connection point at an upper layer, such as a TCP layer, results in a transport flow being established with an identifier associated with such upper layer, such as a TCP port, for example.

FIG. 2C also shows a switch 260 for switching data between MAC layers 244, 250 of the communication stacks 108 and 118, and MAC layers 212 and 214 associated with the physical network interfaces 216 and 218.

Note that the entity management module 210, router 238, and switch 260 of FIGS. 2A, 2B, and 2C, respectively, can be implemented as executable machine-readable instructions.

Figure 3:
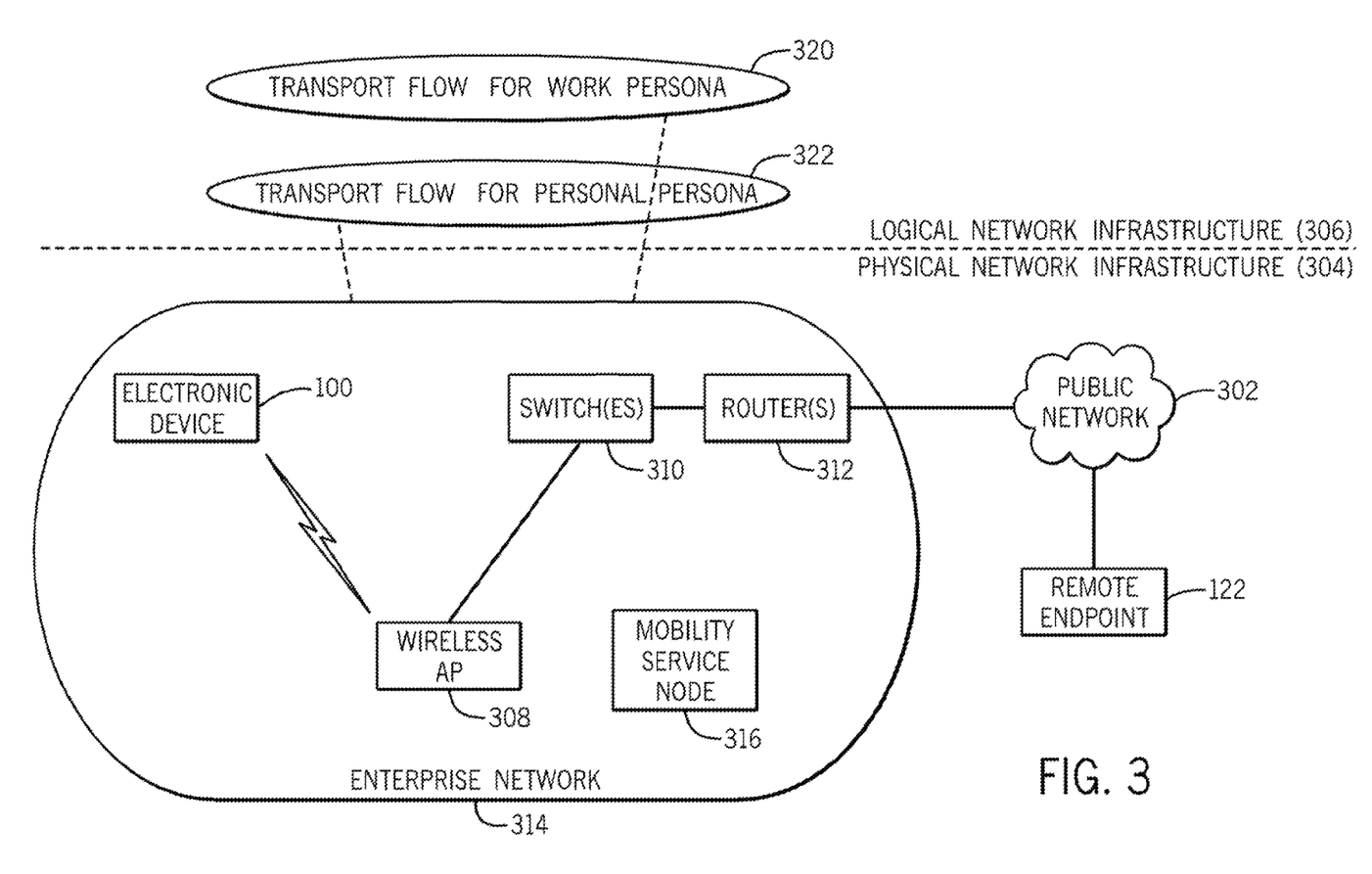
FIGS. 3 and 4 are block diagrams of physical and logical network infrastructures according to various implementations.

FIG. 3 shows an example arrangement that includes a network infrastructure that is able to support communications of data between the electronic device 100 and the remote endpoint 122, which is connected to a public network 302 such as the Internet. The network infrastructure of FIG. 3 includes a physical network infrastructure 304 and a logical network infrastructure 306. The physical network infrastructure 304 includes various network nodes in an enterprise network 314 (such as a local area network of an enterprise), which includes wireless access point(s) 308 and switch(es) 310. The wireless access point(s) 308 in the enterprise network 314 can use WiFi technology or any other wireless communication technology (including cellular technology or other wireless technology) As further shown in FIG. 3, the enterprise network 314 can also include a router(s) 312 to allow communications with the public network 302.

A wireless access point 308 allows wireless connectivity by the electronic device 100 (and any other electronic device within the coverage area of the wireless access point).

The enterprise network 314 also includes a mobility service node 316, which is able to manage mobility of electronic devices in the enterprise network 314. For example, the electronic device 100 can move between coverage areas of respective wireless access points 308 in the enterprise network 314. The mobility service node 316 is able to manage handoff of the electronic device 100 between the wireless access points 308. In some examples, the mobility service node 316 can be a standalone node, or alternatively, can be part of any one or combination of the wireless access point 308, switch 310, router 312, or even the communication device 100. The mobility service node 316 can include the mobility management module 126 of FIG. 1, for example.

The logical network infrastructure 306 includes transport flows 320 and 322 that can be established on the physical network infrastructure 304. In some examples, a transport flow 320 or 322 can include a logical network, such as a virtual local area network (VLAN), a Multi-Protocol Label Switching (MPLS) label-switched path (LSP) network, a pseudo-wire (which provides an emulation of a point-to-point connection over network), an Internet Protocol (IP)-security virtual private network (VPN) (a virtual private network protected by the IP-security or IPsec protocol), and so forth. In other examples, other types of transport flows 320 and 322 cane be provided. The transport flow 320 can be used to communicate data associated with the work persona of the user of the electronic device 100, while the transport flow 322 can be used to communicate data associated with the personal persona of the user of the electronic device 100.

The transport flows 320 and 322 can be established by the transport flow module 124 of FIG. 1, which can be implemented in one or some combination of the wireless access point 308, switch 310, and router 312. The transport flow module 124 can establish the transport flows with respective logical network connection points (such as those depicted in FIGS. 2A-2C) in the electronic device 100.

Upon receiving data from the electronic device 100, the transport flow module 124 can identify the logical network connection point that the received data is associated with, and can assign the received data to a selected one of the transport flows 320 and 322. Each of the logical network connection points can be associated with respective network transport policies. In some implementations, a network transport policy can specify which logical and physical network transport mechanism to use for routing data associated with the corresponding logical network connection point. The network transport policy can also specify other parameters.

Figure 4:
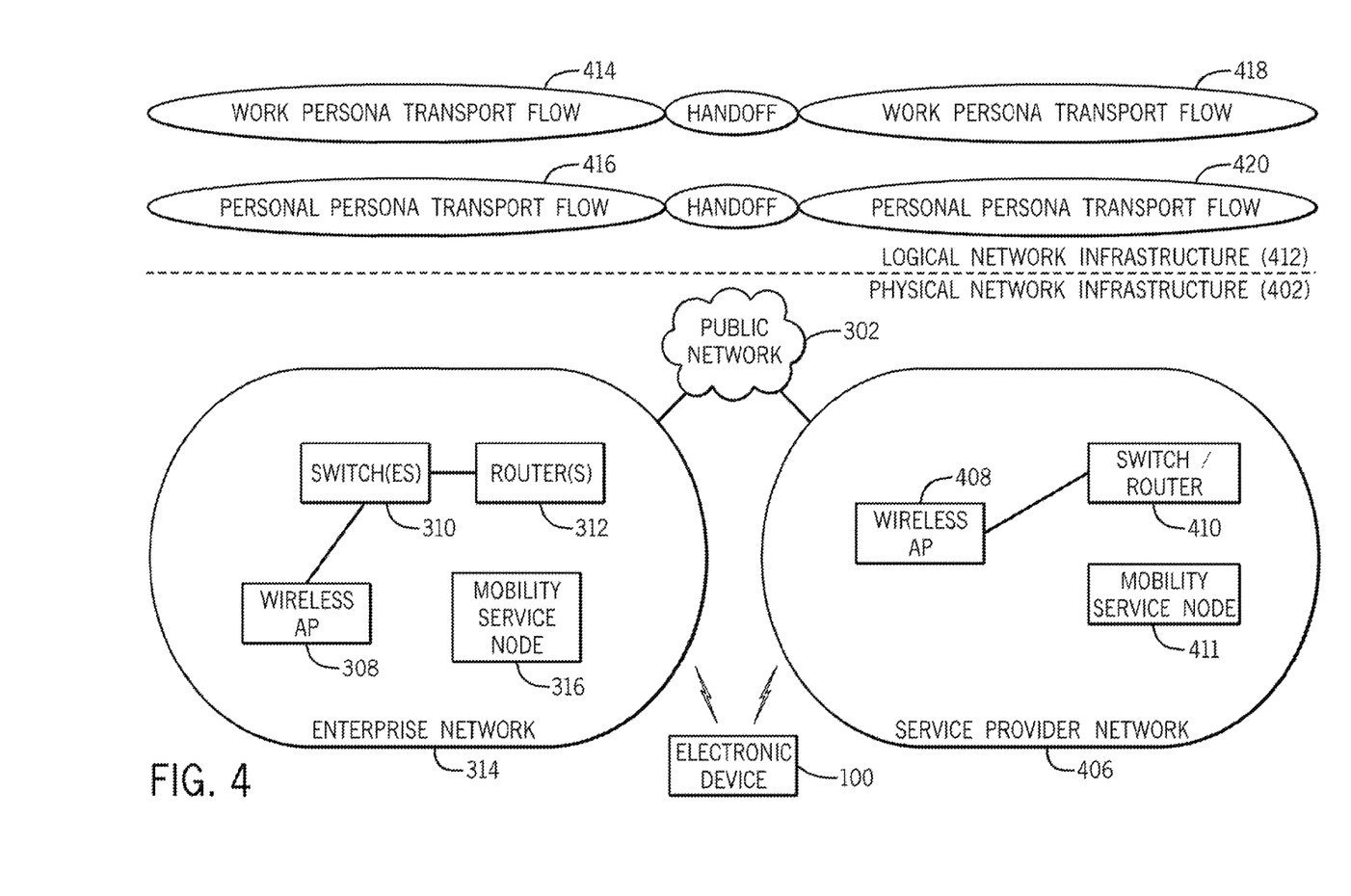

FIG. 4 is a block diagram of a different example arrangement. In the FIG. 4 arrangement, a physical network infrastructure 402 includes the enterprise network 314 (containing the same network nodes as depicted in FIG. 3) and a service provider network 406. While the enterprise network 314 can he a secure or private network of an enterprise, the service provider network 406 can be a public network that is accessible by users or subscribers of the service provider that operates the service provider network 406.

The service provider network 406 includes wireless access point(s) 408, switch(es)/routers) 410, and a mobility service node 411. The wireless access point(s) 408 in the service provider network 406 can use WiFi technology, cellular technology (e.g. 3G, 4G, or beyond technology), or any other wireless communication technology. When the electronic device 100 is attached to the service provider network 406, the electronic device 100 communicates through the service provider network 406 with the public network 302.

The electronic device 100 can selectively attach to either or both of the enterprise network 314 and the service provider network 406, depending upon the location of the electronic device 100. In some examples, as the electronic device 100 moves to different locations, the electronic device 100 can move into or out of coverage areas associated with the enterprise network 314 and the service provider network 406. In some cases, the electronic device 100 can be located at a location that is within the coverage areas of both the enterprise network 314 and the service provider network 406, in which case the electronic device 100 can potentially attach to both the enterprise network 314 and the service provider network 406.

FIG. 4 also shows a logical network infrastructure 412 that can be implemented on the physical network infrastructure 402. The logical network infrastructure 412 includes transport flows 414 and 416 that can be provided on the enterprise network 314 for carrying data associated with different personas of the user of the electronic device 100. In addition, the logical network infrastructure 412 additionally includes transport flows 418 and 420, which can be implemented on the service provider network 406, for carrying data associated with different personas of the user of the electronic device 100. Similar to examples given in FIG. 3, the transport flows 414, 416, 418, and 420 can include VLANs, MPLS LSP networks, pseudo-wires, IP-security VPNs, and so forth.

Depending upon which of the enterprise network 314 and service provider network 406 the electronic device 100 is attached to, handoff of data communications can be performed between the transport flows implemented on the enterprise network 314 and the service provider network 406. As an example, if the electronic device 100 were to leave the enterprise network 314 and enter the service provider network 406, then a handoff is performed where the transport flows 418 and 420 are used to transport data of the electronic device 100 rather than the transport flows 414 and 416. Handoff is managed by the mobility service node 316 in the enterprise network 314, and the mobility service node 412 in the service provider network 406.

Figure 5:
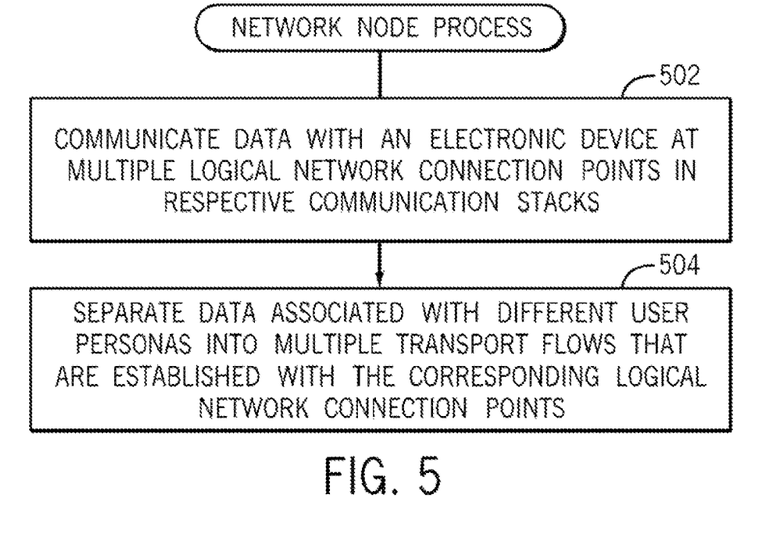
FIG. 5 is a flow diagram of a process according to some implementations.

FIG. 5 is a flow diagram of a process performed by a network node, such as any of the network nodes depicted in FIGS. 1, 4, and 5. The process of FIG. 5 communicates (at 502) data with the electronic device 100 at multiple logical network connection points in respective communication stacks of the electronic device 100. The multiple logical network connection points can correspond to different personas of a user of the electronic device 100. The process of FIG. 5 separates (at 504) the data associated with the different personas into multiple different transport flows that are established with the corresponding logical network connection points.

Figure 6:
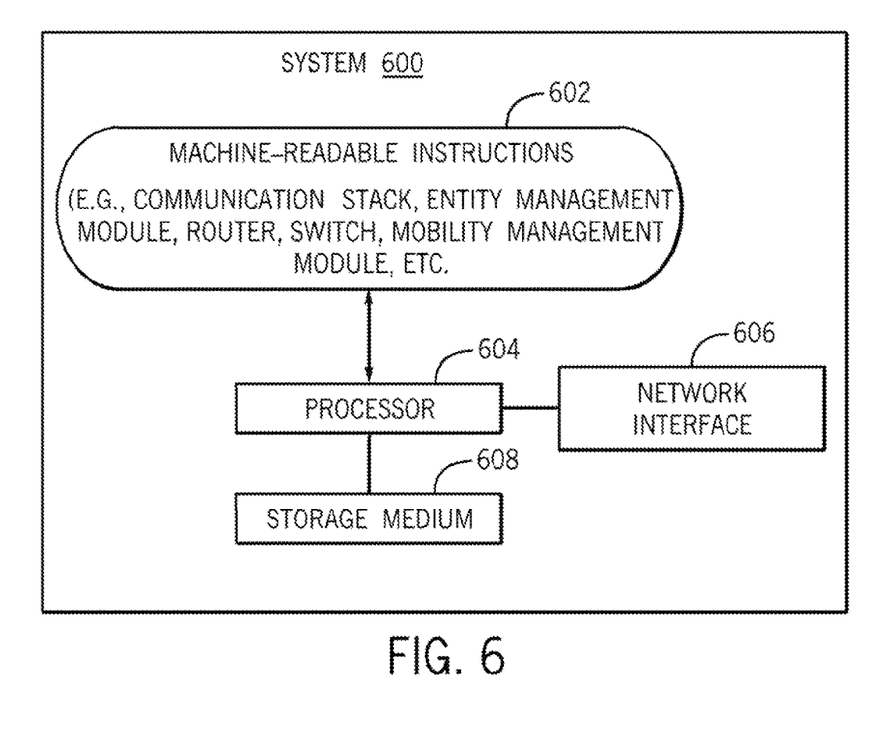
FIG. 6 is a block diagram of an example system according to some implementations.

FIG. 6 is a block diagram of an example system 600. The system 600 can be the electronic device 100 of FIG. 1, or a network node in the network 112 (FIG. 1), enterprise network 314 (FIG. 3 or 4), or service provider network 406 (FIG. 4). The system 600 includes machine-readable instructions 602, which can represent any of the communication stacks 108 and 118 depicted in FIGS. 1 and 2A-2C, the entity management module 210 of FIG. 2A, the router 238 of FIG. 2B, the switch 260 of FIG. 2C, the mobility management module 126 of FIG. 1, and so forth.

The machine-readable instructions 602 are executable on one or multiple processors 604, which can be connected to a network interface 606 to communicate over a data network, and to a storage medium (or storage media) 608 to store data. A processor can include a microprocessor, microcontroller, processor module or subsystem, programmable integrated circuit, programmable gate array, or another control or computing device.

The storage medium (or storage media) 608 can be implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article for article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. An electronic device comprising:
   a plurality of environments corresponding to different personas, each of the plurality of environments includes a respective one of a plurality of applications and a respective one of a plurality of communication stacks for communicating data associated with the respective one of the plurality of applications, wherein each of the plurality of communication stacks includes a respective connection point; and
   a plurality of physical network interfaces, wherein:
      data associated with each of the plurality of environments are communicated via a different one of the plurality of physical network interfaces, which is coupled to the respective one of the communication stacks; and
      data communicated via the different one the plurality of physical network interfaces are separated into different transport flows based on the respective connection point such that the data separated into the different transport flows are isolated from each other.

2. The electronic device of claim 1, wherein each of the plurality of environments corresponds to a different persona, wherein:
   a first persona relates to communications of the user associated with work for an enterprise; and
   a second persona relates to personal communications of the user.

3. The electronic device of claim 1, wherein the electronic device further comprises: p1 a module to selectively route data of a particular one of the communication stacks to either of the plurality of physical network interfaces.

4. The electronic device of claim 1, wherein each of the communication stacks comprises an Internet Protocol (IP) layer and a Medium Access Control (MAC) layer.

5. The electronic device of claim 4, wherein the respective connection point at the corresponding MAC layer.

6. The electronic device of claim 4, wherein the respective connection point is at corresponding upper layers of a respective one of the communication stacks above the IP layer.

7. The electronic device of claim 1, wherein each of the communication stacks comprises an Internet Protocol (IP) layer, and wherein the respective connection points is at the corresponding IP layers.

8. The electronic device of claim 1, wherein the network is a first access network, the electronic device further comprising a control module to interact with a network node to cause handoff data communication associated with a particular one of the plurality of environments from a transport flow on the first access network to a transport flow on a second, different access network.

9. A method of a network node in a network, comprising:
   communicating data associated with a plurality of environments of an electronic device at a plurality of connection points, each of the plurality of connection points corresponds to a respective communication stack of each of the plurality of environments, wherein the data associated with the plurality of environments are communicated via a plurality of different physical network interfaces; and separating data associated with the different user personas into different respective transport flows across the network, the transport flows established with corresponding ones of the connection points, wherein the data separated into different respective transport flows are isolated from each other; and maintaining the separation of the data associated with the different user personas.

10. The method of claim 9, further comprising establishing the transport flows with the respective connection points at corresponding Internet Protocol layers in the communication stacks.

11. The method of claim 9, further comprising establishing the transport flows with the respective connection points at corresponding Medium Access Control (MAC) layers in the communication stacks.

12. The method of claim 9, further comprising establishing the transport flows with the respective connection points at corresponding Transmission Control Protocol (TCP) layers in the communication stacks.

13. The method of claim 9, wherein the network is a first access network, the method further comprising:

in response to movement of the electronic device, initiating a handoff process from the first access network to a second access network to cause data communication associated with the different user personas to be handed off from transport flows on the first access network to transport flows on the second access network.

14. An article comprising a machine-readable storage medium storing instructions that upon execution cause an electronic device to:

provide a plurality of environments comprising respective communication stacks for communicating over a network, wherein the plurality of environments correspond to respective different personas of a user; and separate the data associated with the different personas into different transport flows such that a first set of data being communicated via a first physical network interface and associated with a first communication stack is isolated from a second set of data being communicated via a second physical network interface and associated with a second communication stack, wherein the first physical network interface is different from the second physical network interface;

wherein the plurality of environments along with the first physical network interface and the second physical network interface are included within a same electronic device.

15. The article of claim 14, wherein the network is a first access network, and wherein the instructions upon execution cause the electronic device to further:

cause handoff of communication of data from the transport flows on the first access network to transport flows on a second access network.

* * * * *